United States Patent [19]
Ohashi

[11] Patent Number: 5,412,423
[45] Date of Patent: May 2, 1995

[54] STILL IMAGE RECORDING APPARATUS WHICH PREVENTS ALIASING DISTORTION BY FORMING COLOR DIFFERENCE SIGNALS HAVING RESPECTIVELY MIXED AND WEIGHTED LUMINANCE SIGNALS

[75] Inventor: Kazuhito Ohashi, Kanagawa, Japan

[73] Assignee: Canon Kabushiki Kaisha, Tokyo, Japan

[21] Appl. No.: 263,945

[22] Filed: Jun. 22, 1994

Related U.S. Application Data

[63] Continuation of Ser. No. 874,621, Apr. 27, 1992, abandoned.

[30] Foreign Application Priority Data

May 1, 1991 [JP] Japan ................................. 3-100030
May 1, 1991 [JP] Japan ................................. 3-100031

[51] Int. Cl.⁶ .......................... H04N 9/04; H04N 9/79
[52] U.S. Cl. .................................... 348/234; 348/241; 348/275; 358/330; 358/340
[58] Field of Search ............... 358/310, 330, 340, 335; 348/222, 234, 235, 237, 241, 242, 248, 266, 272, 273, 275, 607, 608, 659, 708, 712, 713; H04N 9/04, 9/79

[56] References Cited

U.S. PATENT DOCUMENTS

| | | | |
|---|---|---|---|
| 4,688,085 | 8/1987 | Imaide | 358/43 |
| 4,714,955 | 12/1987 | Nishimura et al. | 348/237 |
| 4,736,241 | 4/1988 | Murakami et al. | 348/237 X |
| 4,903,122 | 2/1990 | Ozaki et al. | 358/44 |
| 4,939,573 | 7/1990 | Teranishi et al. | 358/44 |
| 5,075,802 | 12/1991 | Ohashi | 358/335 |
| 5,119,180 | 6/1992 | Okamoto | 358/43 |
| 5,153,713 | 10/1992 | Kyuma et al. | 358/41 |
| 5,166,803 | 11/1992 | Sasakura | 358/320 |

Primary Examiner—James J. Groody
Assistant Examiner—John W. Miller
Attorney, Agent, or Firm—Robin, Blecker, Daley; Daley & Driscoll

[57] ABSTRACT

A still image recording apparatus comprises an image sensing part arranged to photoelectrically convert a sensed image light and to output two pairs of color signals and luminance signals which have different sampling patterns, subtraction circuits of two channels arranged to form color-difference signals from the two pairs of color signals and luminance signals obtained from the image sensing part, and a mixing circuit arranged to obtain mixed signals by mixing together signals obtained by multiplying the two luminance signals respectively by constants which differently correspond to a difference between the two luminance signals and to supply the mixed signals respectively to the subtraction circuits as luminance signals.

18 Claims, 10 Drawing Sheets

STILL IMAGE RECORDING APPARATUS WHICH PREVENTS ALIASING DISTORTION BY FORMING COLOR DIFFERENCE SIGNALS HAVING RESPECTIVELY MIXED AND WEIGHTED LUMINANCE SIGNALS

This is a continuation application under 37 CFR 1.62 of prior application Ser. No. 07/874,621, filed Apr. 17, 1992, now abandoned.

BACKGROUND OF THE INVENTION

1. Field of the Invention

This invention relates to a still image recording apparatus of the kind recording a still image on a magnetic disc or the like.

2. Description of the Related Art

An SV (still video) system has been known as a system of, for example, recording a still image of the NTSC color system on a two-inch magnetic disc. A system called CHSV (format compatible high definition SV) system which permits recording of an image with such high picture quality as having 1000 picture elements (in the vertical direction)×1300 picture elements (in the horizontal direction) on an SV floppy disc (the magnetic disc) and is arranged to have interchangeability with the conventional SV system has recently been proposed. The CHSV system is briefly described in outline below as the details of this system are well known.

The CHSV system uses a method for analog transmission of sample values. This method is used also for the MUSE (multiple sub-Nyquist sampling encoding) system which is known by the name of an HDTV (high definition television) transmission system. According to this analog transmission method, an analog transmission path on which a given band limit is imposed is used for correct transmission of a train of sample values (at intervals of time T). The analog transmission of sample values requires the following two conditions (a) and (b):

(a) The frequency characteristic of the analog transmission path has a linear phase and is of a symmetric roll-off characteristic centered at the frequency of $\frac{1}{2}T$ (Nyquist condition).

(b) A correct sampling point can be re-sampled on the signal receiving side for reproduction.

The CHSV system is basically arranged to record and reproduce, on these two conditions, a train of sample values of a video signal on and from an SV floppy disc in conformity with the recording format of the conventional SV system.

Figure 1:
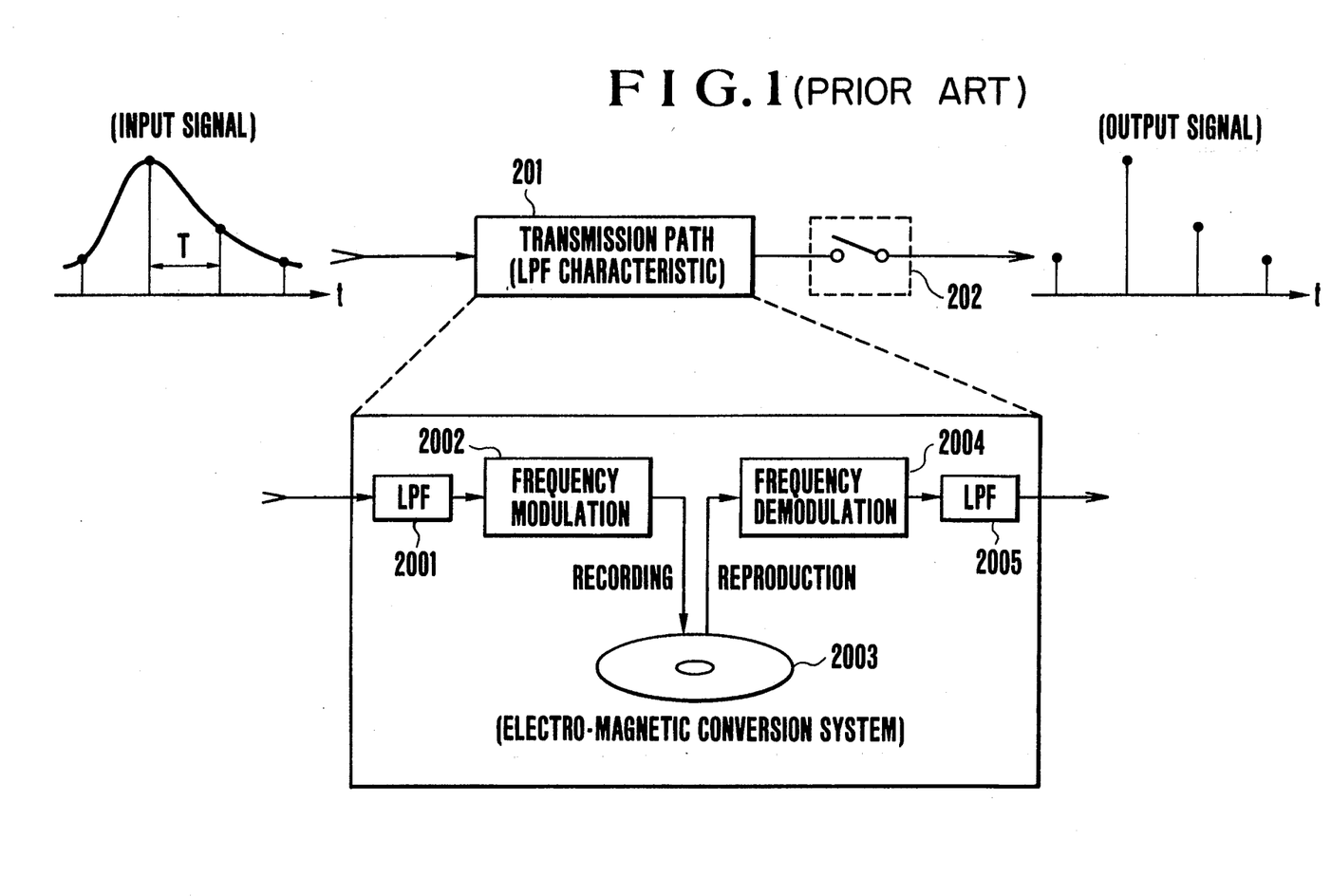
FIG. 1 is an illustration of the concept of analog transmission of sample values.

FIG. 1 schematically shows the above-stated analog transmission of sample values. Referring to FIG. 1, a signal transmission path 201 has an LPF (low-pass filter) characteristic. Sampling means 202 is arranged to perform re-sampling. An input signal to the transmission path 201 is band-limited by means of an LPF 2001. The band-limited signal is frequency-modulated by a frequency modulation circuit 2002. The frequency-modulated signal is magnetically recorded on an SV floppy disc 2003 through an electromagnetic conversion system. A signal which is reproduced from the SV floppy disc 2003 is demodulated by a frequency demodulation circuit 2004. The demodulated signal is outputted and supplied to the above-stated sampling means 202 through an LPF 2005.

Figure 2A:
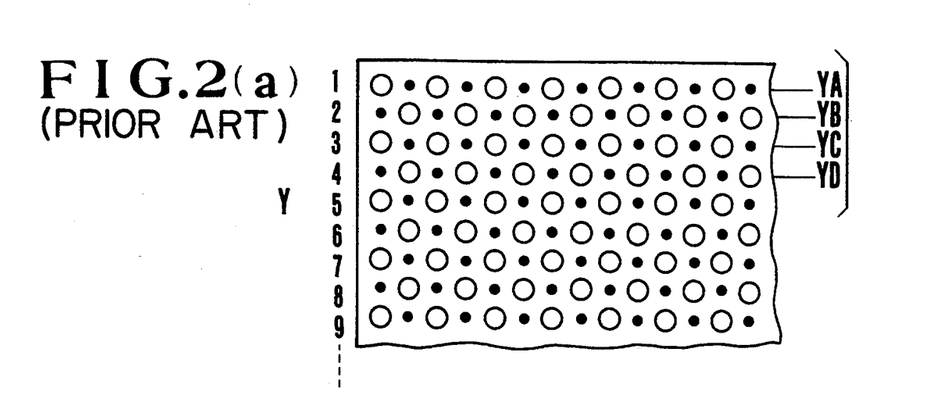
FIGS. 2(a), 2(b) and 2(c) show the sample patterns of luminance signals and color signals.
Figure 2B:
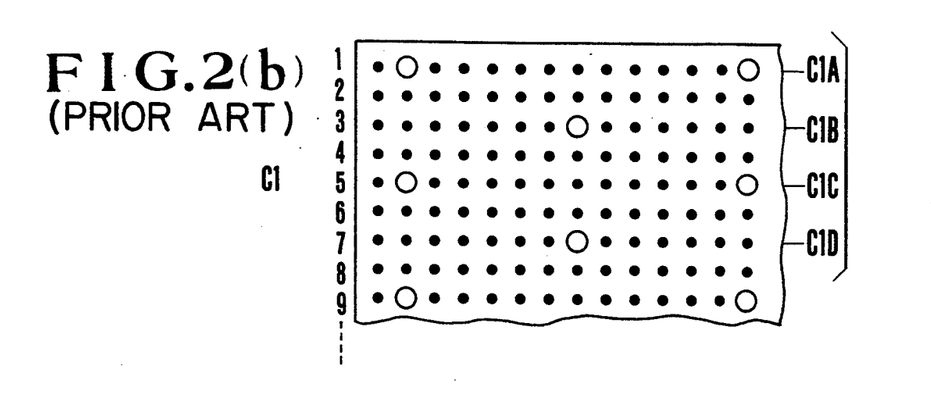
Figure 2C:
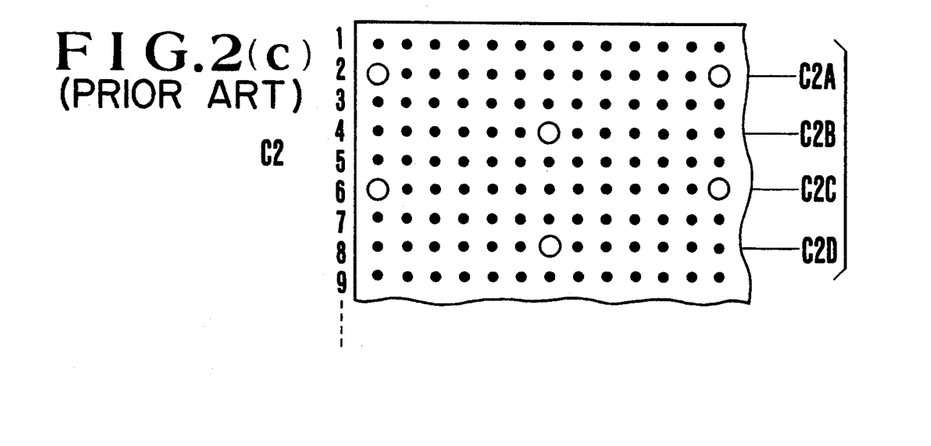

Further, FIGS. 2(a), 2(b) and 2(c) show the sample patterns of a luminance signal Y and color-difference signals C1 and C2 to be recorded on the SV floppy disc by the above-stated CHSV system. In this instance, color-difference signals R−Y and B−Y are shown as the color-difference signals C1 and C2 for sorting the sampling points. Therefore, if the signal C1 represents the color-difference signal R−Y, the signal C2 represents the color-difference signal B−Y. If the signal C1 represents the color-difference signal B−Y, the signal C2 represents the color-difference signal R−Y. In the CHSV system, each of the signals Y, C1 and C2 having the sample patterns shown in FIGS. 2(a), 2(b) and 2(c) is divided into four kinds, and the four kinds of signals are recorded in four tracks on the SV floppy disc. For this purpose, the signals Y, C1 and C2 are respectively divided in different manners as shown in Tables 1, 2 and 3 below:

Table 1. Signal Y

Signal YA: Sample point of signal Y on (4n+1) line
Signal YB: Sample point of signal Y on (4n+2) line
Signal YC: Sample point of signal Y on (4n+3) line
Signal YD: Sample point of signal Y on (4n+4) line Table 2. Signal C1

Signal C1A: Sample point of signal C1 on (8n+1) line
Signal C1B: Sample point of signal C1 on (8n+3) line
Signal C1C: Sample point of signal C1 on (8n+5) line
Signal C1D: Sample point of signal C1 on (8n+7) line Table 3. Signal C2

Signal C2A: Sample point of signal C2 on (8n+2) line
Signal C2B: Sample point of signal C2 on (8n+4) line
Signal C2C: Sample point of signal C2 on (8n+6) line
Signal C2D: Sample point of signal C2 on (8n+8) line Notes: In these tables, n represents 0, 1, 2, 3, - - - .

Figure 3:
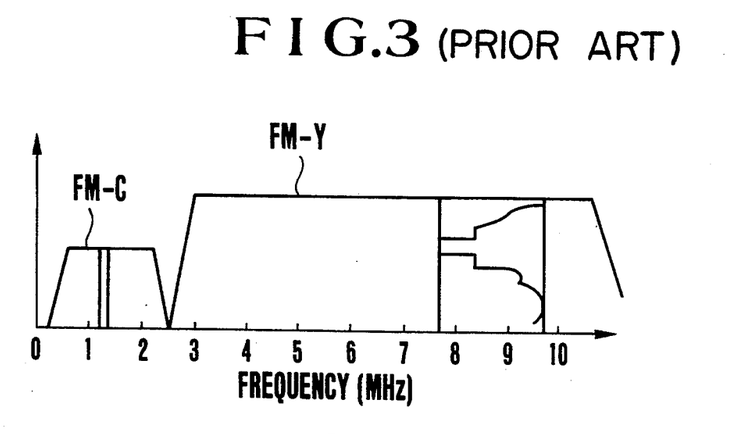
FIG. 3 shows the frequency allocation of recording signals in the SV format.
Figure 4:
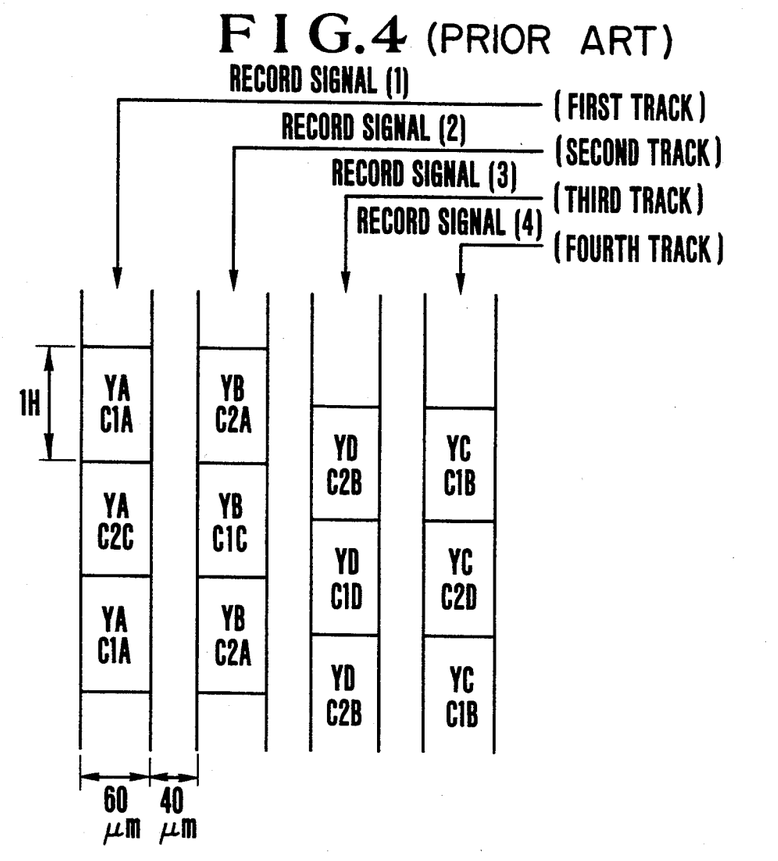
FIG. 4 shows the recording pattern of the CHSV system.

In accordance with the recording format of the conventional SV system (SV format), a frequency-modulated signal Y (or FM−Y) and a frequency-modulated color-difference line-sequential signal C1/C2 (or FM−C) are frequency-multiplexed before recording. FIG. 3 shows the frequency allocation of the recording signals of the SV format. Further, in the case of the CHSV system, the signals C1A to C1D and C2A to C2D are frequency-multiplexed, after frequency modulation, with the signals YA to YD (Tables 1, 2 and 3 above) in combinations as shown in Table 4 below:

Table 4 signal (1): signal YA−signal C1A/C2C
signal (2): signal YB−signal C2A/C1C
signal (3): signal YD−signal C2B/C1D
signal (4): signal YC−signal C1B/C2D FIG. 4 shows a recording pattern in which the signals (1) to (4) of Table 4 above are recorded on the SV floppy disc. These signals (1) to (4) are respectively recorded in first to fourth tracks on the SV floppy disc. In FIG. 4, a reference symbol 1H denotes one horizontal scanning period. These tracks measure respectively 60 μm in width and are spaced at intervals of 40 μm.

In reproducing, with the conventional SV reproducing apparatus, a video signal thus recorded on the SV floppy disc in conformity to the CHSV system, the SV floppy disc is completely interchangeable at least in the field mode of reproduction and is also interchangeable in a case where, for example, records in the second and third tracks shown in FIG. 4 are to be reproduced in the frame mode of reproduction. Further, in reproducing the video signal with the CHSV system, a train of sample values recorded in the four tracks can be restored perfectly to the original sample values by carrying out re-sampling correctly at the sample points. During the process of reproduction, the signals thus obtained are stored in a memory. After that, picture elements other than the picture elements of the sample points shown in FIGS. 2(a), 2(b) and 2(c) are interpolated so that a still image consisting of 1000×1300 picture elements or thereabout can be completely reproduced.

Figure 5:
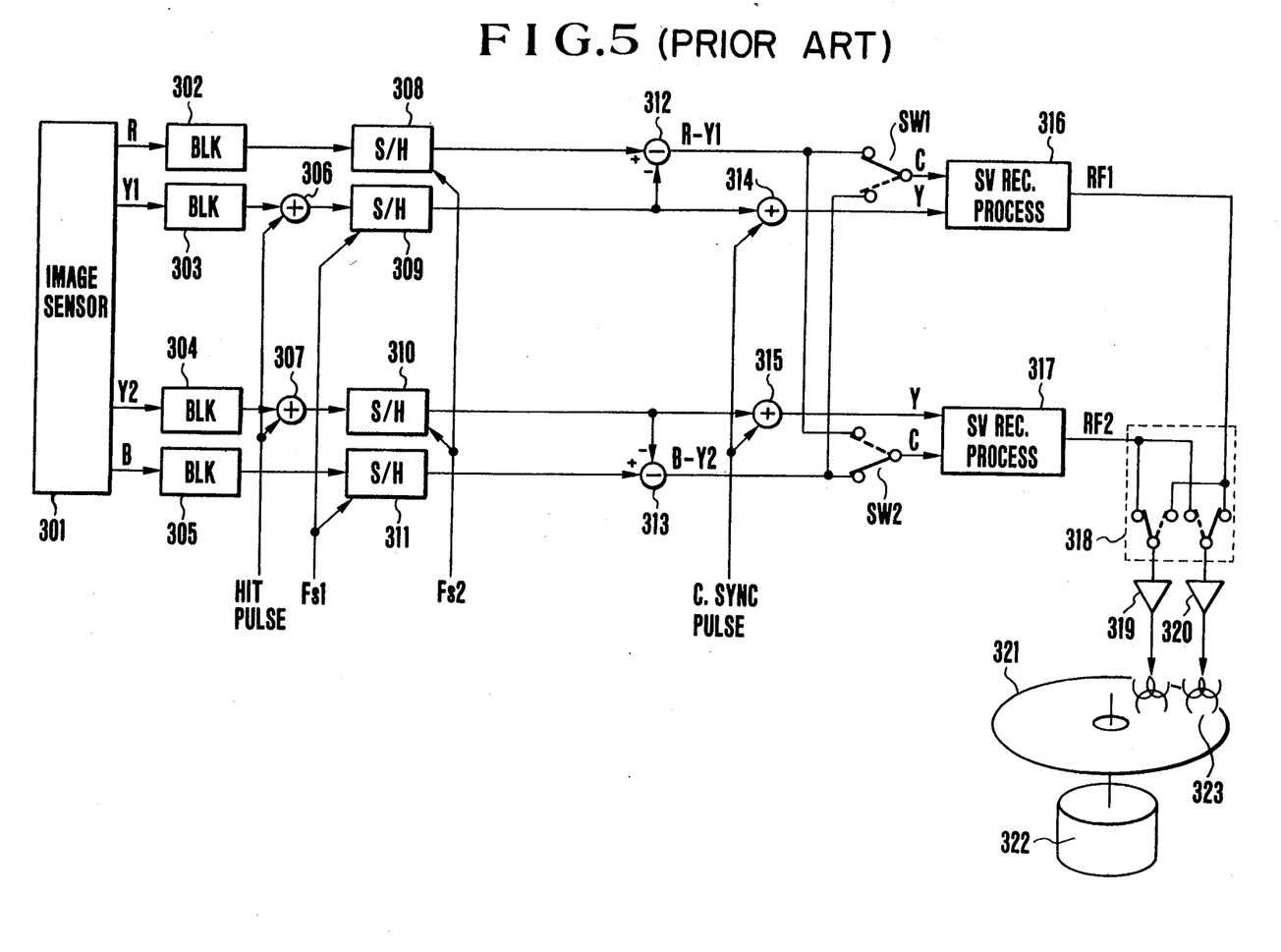
FIG. 5 is a block diagram showing in outline the arrangement of an electronic camera conforming to the CHSV system.
Figure 6:
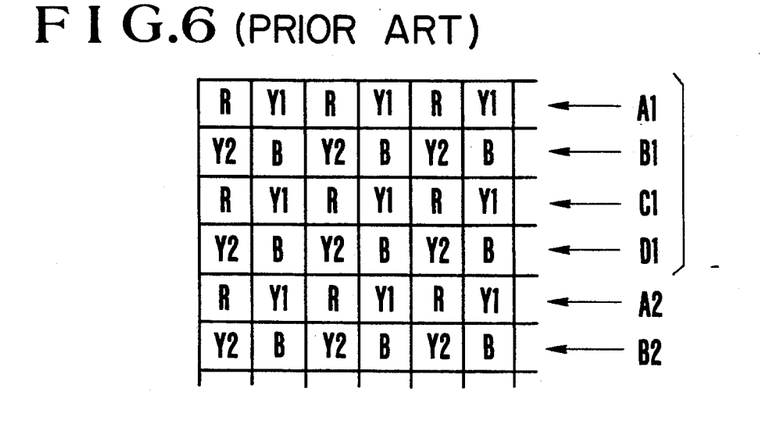
FIG. 6 shows the arrangement of the color filter of an image sensor.

FIG. 5 is a block diagram showing in outline the arrangement of an electronic camera arranged in conformity to the above-stated CHSV system. Referring to FIG. 5, an image sensor 301 which is composed of a CCD or the like is provided with a color filter which is arranged as shown in FIG. 6. The image sensor 301 is arranged to output signals of four kinds including signals R, Y1, Y2 and B and to simultaneously read out either the paired signals of lines A and B or the paired signals of lines C and D shown in FIG. 6. The signals R, Y1, Y2 and B from the image sensor 301 are supplied to blanking circuits 302 to 305 to be subjected to a blanking process. The signals Y1 and Y2 are then supplied to addition circuits 306 and 307 to have HIT (horizontal interval test) pulses added to the signals Y1 and Y2 at the left ends of their lines as phase reference signals which are to be used for re-sampling at the time of reproduction. These signals are supplied to S/H (sample-and-hold) circuits 308 to 311 to be sampled and held there in accordance with clock signals Fs1 and Fs2. In other words, the output signals of the image sensor 301 and the above-stated HIT pulses are sampled and held to become rectangular sample-value signals to be used for the analog transmission of sample values mentioned in the foregoing. Further, the phase of the clock signal Fs1 differs 180 degrees from that of the clock signal Fs2. This phase difference corresponds to a positional discrepancy existing as much as one picture element in the horizontal direction between the pair of signals R and Y2 and the pair of signals Y1 and B as shown in FIG. 6.

The above-stated sampled signals are supplied to subtraction circuits 312 and 313 which form color-difference signals R−Y1 and B−Y2 and to addition circuits 314 and 315 which add synchronizing pulse signals to the luminance signals Y1 and Y2. Further, switches SW1 and SW2 form a color-difference line-sequential signal from the color-difference signals R−Y1 and B−Y2.

In this instance, the switches SW1 and SW2 are arranged not to select the same color-difference signal at the same time.

The signals processed in the above-stated manner are supplied to recording signal processing circuits 316 and 317. The recording signal processing circuit 316 and 317 then perform various processes including an emphasis process, a frequency modulation process, etc. Although it is not shown, the recording signal processing circuits 316 and 317 may be arranged to add (by frequency multiplexing) some pilot signals for TBC (time base correction) to be made at the time of reproduction. After these processes, signals thus obtained are supplied to a switcher 318. The switcher 318 is provided for the purpose of realizing the recording pattern shown in FIG. 4. The picture element information of the lines A and B on the image sensor 301 shown in FIG. 6 is first supplied to heads 323 of two channels via amplifiers 319 and 320. The heads 323 then record the image information in two tracks on an SV floppy disc 321 which is being rotated by a spindle motor 322. After that, the heads 323 move a distance corresponding to two tracks. After that, the picture element information of the lines C and D of FIG. 6 is recorded in next two tracks on the disc 321. In this instance, the recording tracks are changed over by the switcher 318 for the picture element information of the lines C and D.

However, in the case of the above-stated still image recording apparatus, the amount of picture elements of signals R and B is only one half of the amount of picture elements of signals Y1 and Y2 (the signal Y) as shown in FIG. 6. Therefore, aliasing distortions take place in the signals R and B in the vertical and horizontal line parts (including edge parts) of a black-and-white image to degrade the quality of the picture thus obtained. This problem is caused by the following reason: an optical LPF is applied on the side of the camera of the apparatus for securing a necessary resolution for the signal Y. Therefore, a pre-filtering effect is not sufficiently attained for the signals R and B in the horizontal and vertical directions. As a result, the color-difference signals also have the aliasing distortions to further degrade the picture quality.

SUMMARY OF THE INVENTION

In view of the above-stated problem, it is an object of this invention to provide a still image recording apparatus which is capable of preventing any aliasing distortion from taking place in the vertical and horizontal line parts of a black-and-white image, so that the picture quality can be greatly improved.

To attain this object, a still image recording apparatus arranged according to this invention as an embodiment thereof comprise an image sensing part arranged to photoelectrically convert a sensed image light and to output two pairs of color signals and luminance signals, the two pairs having different sampling patterns from each other; subtraction circuits of two channels arranged to form color-difference signals from the two pairs of color signals and luminance signals obtained from the image sensing part; and a mixing circuit arranged to obtain mixed signals by mixing together signals obtained by multiplying the two luminance signals respectively by constants which differently correspond to a difference between the two luminance signals and to supply the mixed signals respectively to the subtraction circuits as luminance signals.

In the still image recording apparatus according to this invention, the two pairs of color signals and luminance signals which differ in sampling pattern are outputted from the image sensing part; and their color-difference signals are obtained by arithmetic operations at the subtraction circuits. In this instance, the signals obtained by mixing together signals obtained by multiplying the two luminance signals by constants which differently correspond to a difference between the two luminance signals are supplied to the subtraction circuits as luminance signals. This arrangement enables the embodiment to cancel out the aliasing components of the vertical and horizontal line parts of a black-and-white image.

A still image recording apparatus which is arranged as another embodiment of this invention comprises an image sensing part arranged to photoelectrically convert a sensed image light and to output two pairs of color signals and luminance signals, the two pairs having different sampling patterns from each other; subtraction circuits of two channels arranged to form color-difference signals from the two pairs of color signals and luminance signals obtained from the image sensing part; and a switch circuit arranged to supply the two luminance signals to the subtraction circuits of two channels, respectively, by switching the two luminance signals from one over to the other, the switching being made in accordance with a control signal formed on the basis of a result of comparison obtained by comparing a difference between the two luminance signals with reference values.

In the still image recording apparatus arranged as another embodiment of this invention, the two pairs of color signals and luminance signals which differ in sampling pattern are outputted from the image sensing part; and their color-difference signals are obtained by arithmetic operations at the subtraction circuits. In that instance, the two luminance signals are supplied to the subtraction circuits, respectively, in a state of being switched from one over to the other. That arrangement enables the embodiment to cancel out the aliasing components of the vertical and horizontal line parts of a black-and-white image.

The above and other objects and features of this invention will become apparent from the following detailed description of embodiments thereof taken in conjunction with the accompanying drawings.

DETAILED DESCRIPTION OF THE PREFERRED EMBODIMENTS

Figure 7:
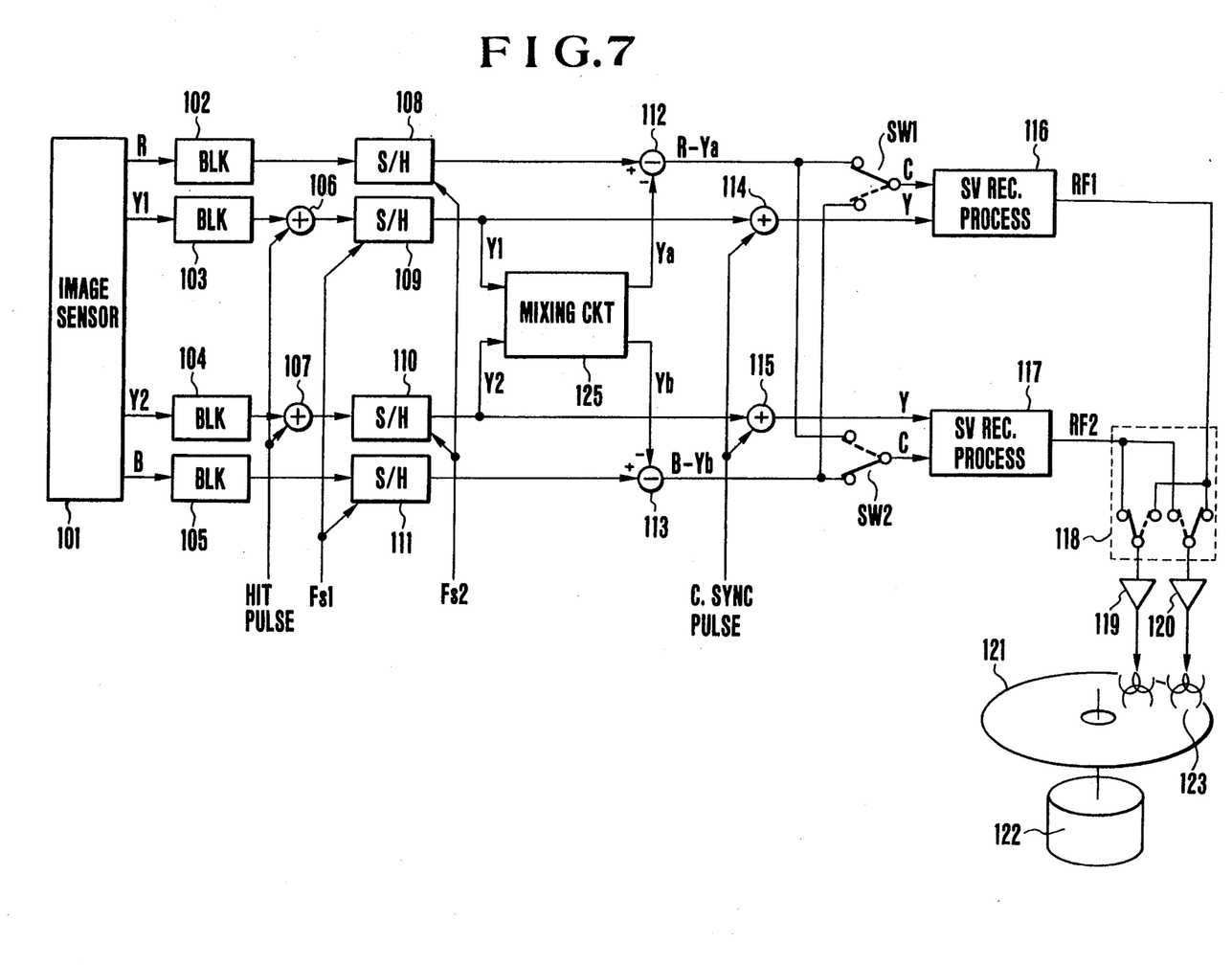
FIG. 7 is a block diagram showing the arrangement of an embodiment of this invention.

FIG. 7 is a block diagram showing the arrangement of an embodiment of this invention. The basic arrangement of the embodiment is similar to that of the apparatus shown in FIG. 5. In FIG. 7, a reference numeral 101 denotes an image sensor which is a CCD or the like and is provided with the color filter shown in FIG. 6. The image sensor 101 constitutes an image sensing part which is arranged to photoelectrically convert a sensed image light and to output two pairs of color signals R and B and luminance signals Y1 and Y2. The two pairs of color signals and luminance signals have different sample patterns from each other. Blanking (BLK) circuits 102 to 105 are arranged to perform a blanking process. Addition circuits 106 and 107 are arranged to add the HIT pulses mentioned in the foregoing to the left ends of lines only in the luminance signals Y1 and Y2 as a phase reference signal which is to be used for re-sampling at the time of reproduction. Sample-and-hold (S/H) circuits 108 to 111 are arranged to sample and hold video signals according to clock signals Fs1 and Fs2. Subtraction circuits 112 and 113 are arranged in two channels to form color-difference signals R−Ya and B−Yb, respectively, from the two pairs of color signals and luminance signals coming from the image sensor 101. The subtraction circuits 112 and 113 respectively receive luminance signals Ya and Yb through a mixing circuit 125. The luminance signals Ya and Yb are obtained by mixing together signals obtained respectively by multiplying the luminance signals Y1 and Y2 by constants which differently correspond to a difference between the luminance signals Y1 and Y2.

Addition circuits 114 and 115 are arranged to add synchronizing pulses for color signals to the luminance signals Y1 and Y2. Recording signal processing circuits 116 and 117 conform to the SV system. Each of the recording signal processing circuits 116 and 117 is arranged to receive a color-difference line-sequential signal C through a switch SW1 or SW2 and to receive the luminance signal Y to which the synchronizing pulse mentioned in the foregoing is added. A switcher 118 is arranged to realize the recording pattern shown in FIG. 4. Amplifiers 119 and 120 are arranged to amplify recording signals. An SV floppy disc 121 is used as a magnetic recording medium. A spindle motor 122 is arranged to drive and rotate the SV floppy disc 121. A 2-channel head 123 is arranged to record picture element information on the SV floppy disc 121.

The image sensor 101 simultaneously reads out either a pair of signals of lines A and B or a pair of signals of lines C and D shown in FIG. 6 and outputs four signals including color signals R and B and luminance signals Y1 and Y2. These signals are supplied to the blanking circuits 102 to 105 to be subjected to a blanking process. After the blanking process, these signals are sampled by the S/H circuits 108 to 111. Before the sampling process, the HIT pulses are added to the luminance signals Y1 and Y2 as a phase reference signal to be used at the time of reproduction as mentioned in the foregoing. The sampling process is performed at the timing of the clock signals Fs1 and Fs2. The phases of the clock signals Fs1 and Fs2 deviate 180 degrees from each other. This phase difference is arranged to correspond to the fact that the positions of a pair of the signals R and Y2 deviate from those of a pair of the signals Y1 and B a distance corresponding to one picture element in the horizontal direction. The signals thus sampled by the S/H circuits 108 to 111 become rectangular sample value signals for the analog transmission of sample values mentioned in the foregoing.

The subtraction circuits 112 and 113 form color-difference signals from the sampled color signals and luminance signals as mentioned above. However, luminance signals supplied to the subtraction circuits 112 and 113 are the luminance signals Ya and Yb which come through the mixing circuit 125. The subtraction circuits 112 and 113 thus output color-difference signals R−Ya and B—Yb, respectively. These color-difference signals R—Ya and B—Yb become color-difference line-sequential signals through the switches SW1 and SW2 before they are supplied to the recording signal processing circuits 116 and 117. At that time, the switches SW1 and SW2 are controlled not to simultaneously select one and the same color-difference signal. Meanwhile, the luminance signals Y1 and Y2 from the image sensor 101 are supplied to the recording signal processing circuits 116 and 117 after the above-stated synchronizing pulses are added to the luminance signals Y1 and Y2 at the addition circuits 114 and 115.

The signals supplied to the recording signal processing circuits 116 and 117 are subjected to various processes including an emphasis process, a frequency modulation process, etc. In addition to these processes, pilot signals to be used for TBC at the time of reproduction is added to these input signals by frequency multiplexing. The recording signal processing circuits 116 and 117 then output signals RF1 and RF2, respectively. The signals RF1 and RF2 are supplied to the 2-channel head 123 via the switcher 118 and the amplifiers 119 and 120 to be recorded on the SV floppy disc 121 which is being rotated by the motor 122. At that time, the picture element information of the lines A and B on the image sensor 101 shown in FIG. 6 is first recorded in two tracks on the SV floppy disc 121. After that, the head 123 moves a distance corresponding to two tracks. Then, the picture element information of the lines C and D shown in FIG. 6 is recorded in these next two tracks. A still image is thus recorded in a recording pattern as shown in FIG. 4.

As mentioned in the foregoing, the luminance signals Ya and Yb are supplied from the mixing circuit 125 to the subtraction circuits 112 and 113 which are arranged to supply the color-difference signals R—Ya and B—Yb to the recording signal processing circuits 116 and 117, respectively. The details of the arrangement of the mixing circuit 125 are shown in FIG. 8.

Figure 8:
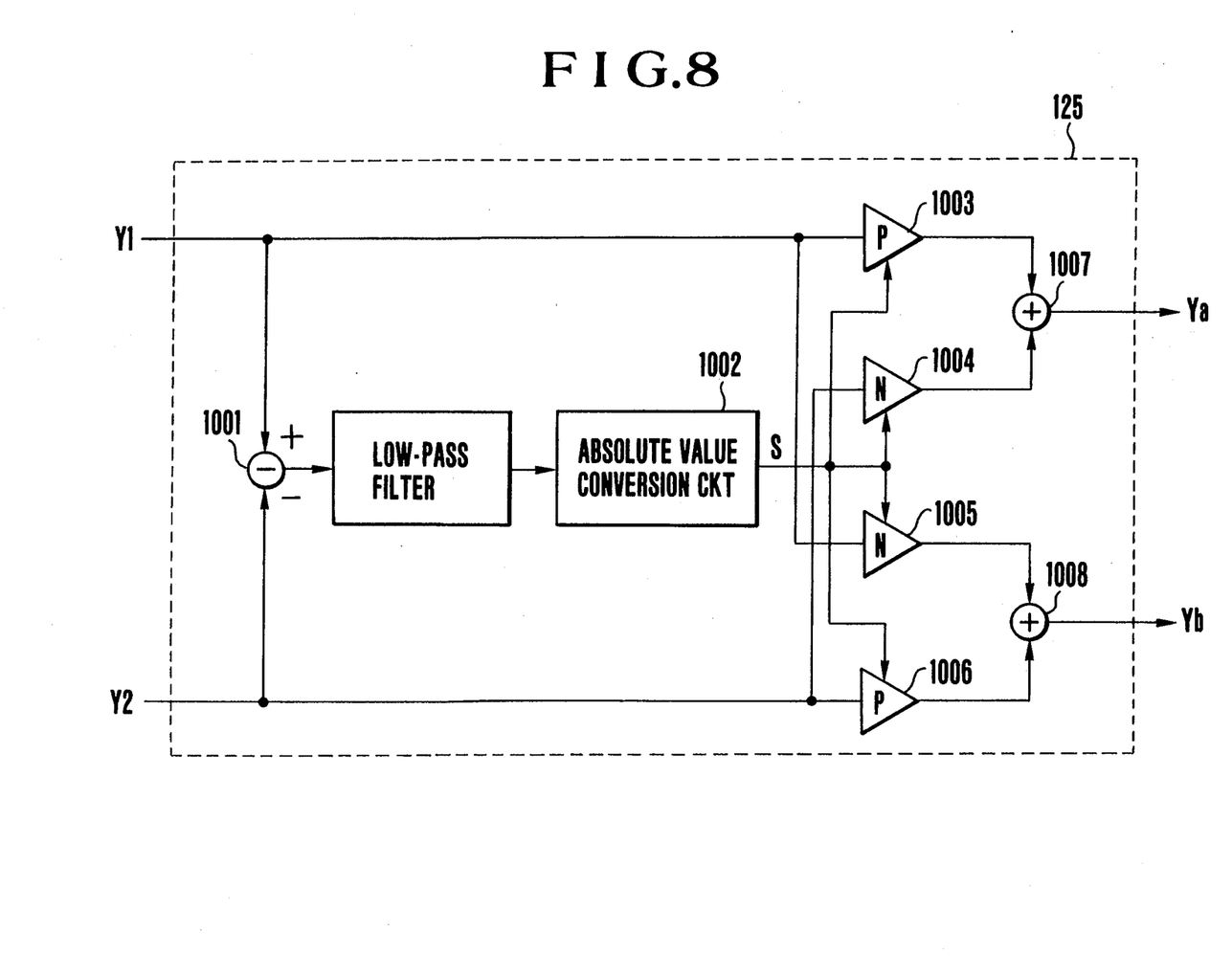
FIG. 8 is a circuit diagram showing the details of a mixing circuit shown in FIG. 7.
Figure 9:
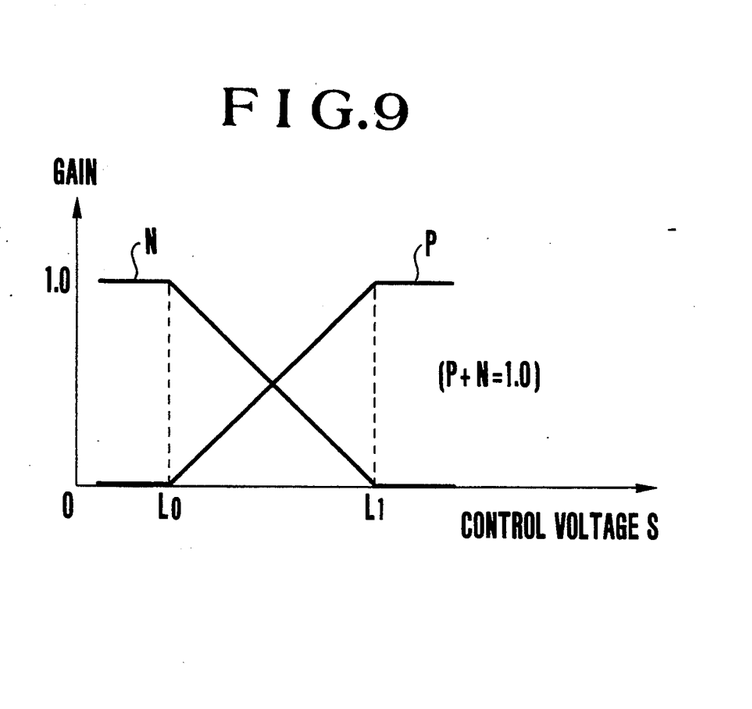
FIG. 9 shows the characteristic of voltage-controlled amplifiers shown in FIG. 8.

Referring to FIG. 8 along with FIG. 7, the luminance signals Y1 and Y2 from the image sensor 101 are supplied to the mixing circuit 125. At the mixing circuit 125, a subtraction circuit 1001 is arranged to compute a difference (Y1—Y2) between the luminance signals Y1 and Y2. A subtraction signal thus obtained is supplied to an absolute value conversion circuit 1002 to be converted into a signal of an absolute value ($|Y1-Y2|$). This absolute value signal is supplied as a control voltage S to voltage-controlled amplifiers 1003 to 1006. Among these voltage-controlled amplifiers, the amplifiers 1003 and 1006 are arranged to give a positive gain VCA-P and the amplifiers 1004 and 1005 are arranged to give a negative gain VCA-N (P+N=1.0). FIG. 9 shows the characteristic of the gains VCA-P and VCA-N. The gains of the luminance signals Y1 and Y2 are controlled by these amplifiers 1003 to 1006. Addition circuits 1007 and 1008 are arranged to add together the outputs of the amplifiers 1003 to 1006 as shown in FIG. 8. As a result, the addition circuits 1007 and 1008 output the luminance signals Ya and Yb.

Figure 10:
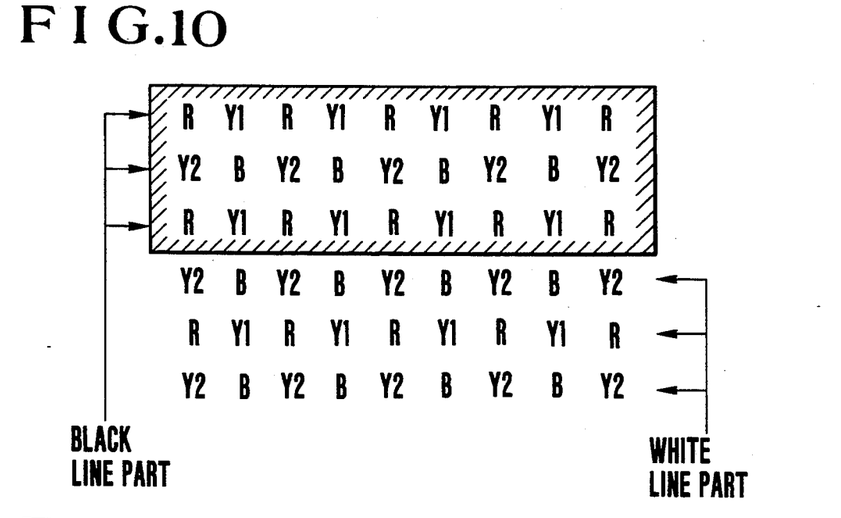
FIG. 10 shows by way of example a black-and-white image.
Figure 11:
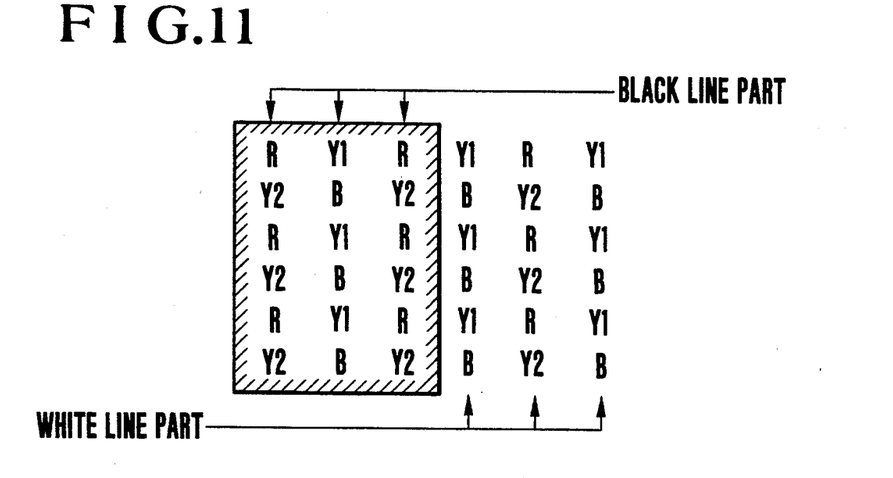
FIG. 11 shows another example of a black-and-white image.

In the case of the horizontal line part of a black-and-white image as shown in FIG. 10, for example, the control voltage S take a very large value. There is obtained a state of S>L1. Accordingly, in the equations of Ya=P×Y1+N×Y2 and Yb=N×Y1+P=Y2, there are obtained P=1 and N=0. Further, in the case of the vertical line part of a black-and-white image as shown in FIG. 11, the control voltage S takes a very small value to obtain a state of S<L0. Accordingly, there are obtained P=0 and N=1. Therefore, in both the vertical line part and the horizontal line part, the color-difference signals R—Ya and B—Yb become (R—Ya)=0 and (B—Yb)=0, so that the aliasing component can be canceled. Further, in a case where the value of an absolute value $|Y1-Y2|$ is between points L0 and L1 of FIG. 9, the luminance signals Ya and Yb become added-mixture values, which can be expressed as follows: Ya=P-×Y1+N×Y2 and Yb=N×Y1+P×Y2.

In other words, with a constant K ($0\leq K\leq 1$) set to be variable according to the magnitude of the above-stated control voltage S, the subtraction circuit 112 performs an arithmetic operation according to a formula of R—[K×Y1—(1—K)×Y2], while the other subtraction circuit 113 performs an arithmetic operation according to a formula of B—[(1—K)×Y1—K×Y2]. The color-difference signals R—Ya and B—Yb are formed by these arithmetic operations and are supplied to the recording signal processing circuits 116 and 117. In this instance: K=P and (1—K)=N. Even in cases where the above-stated vertical and horizontal line parts (including edge parts) are not clearly distinguishable, the above-stated computing control enables the points L0 and L1 of FIG. 9 to be set at suitable values, so that the aliasing components of the color-difference signals can be canceled during the process of forming the color-difference signals. Therefore, the aliasing distortions can be prevented from taking place in the vertical and horizontal line parts of a black-and-white image. The picture quality thus can be greatly improved by the above-stated arrangement.

Figure 12:
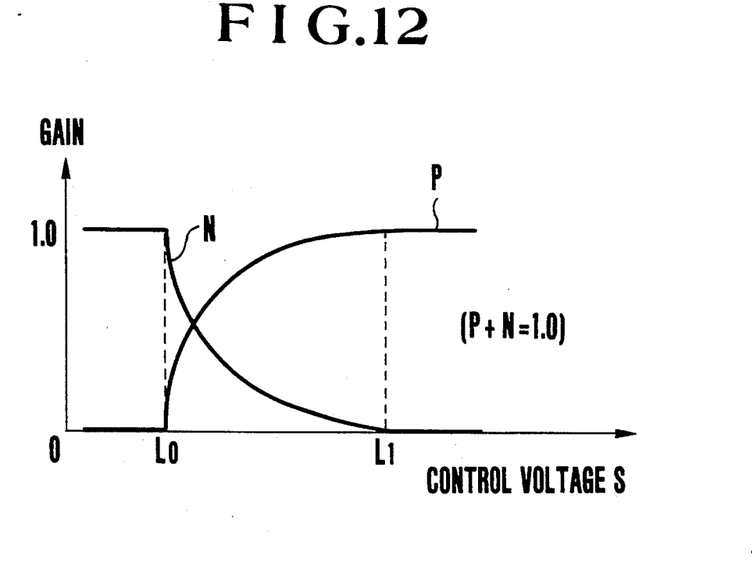
FIG. 12 shows an example of the characteristic of the voltage-controlled amplifiers shown in FIG. 8.

Further, the voltage-controlled amplifiers 1003 to 1006 shown in FIG. 8 may be arranged to have a nonlinear characteristic as shown in FIG. 12.

In this embodiment, as described above, each of the subtraction circuits is arranged to receive, as a luminance signal, a signal obtained by intermixing signals obtained by multiplying two luminance signals outputted from the image sensing part by constants which correspond to a difference between the two luminance signals. By virtue of this arrangement, the aliasing components in the vertical and horizontal line parts, including edge parts, of a black-and-white image can be canceled during the process of forming the color-difference signals. The aliasing distortions in the vertical and horizontal line parts of a black-and-white image are thus prevented, so that the picture quality can be greatly improved.

Figure 13:
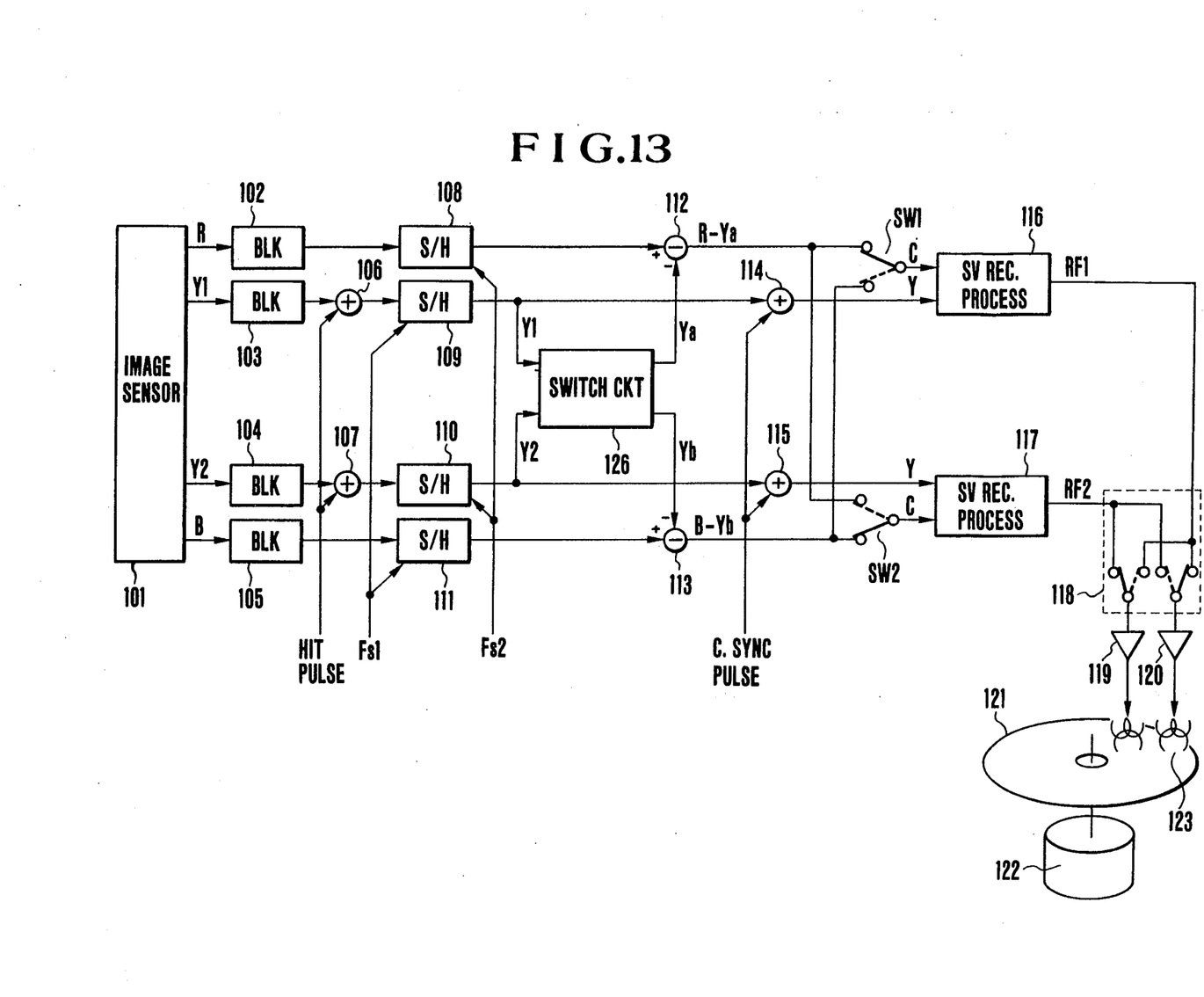
FIG. 13 is a block diagram showing the arrangement of another embodiment of this invention.

Next, another embodiment of this invention is described as follows: FIG. 13 is a block diagram showing the arrangement of the embodiment. Referring to FIG. 13, an image sensor 101 is provided with a color filter as shown in FIG. 6 and constitutes an image sensing part. The image sensing part is arranged to photoelectrically convert a sensed image light and to output two pairs of color signals R and B and luminance signals Y1 and Y2. The two pairs of color signals and luminance signals have different sampling patterns from each other. Blanking circuits 102 to 105 are arranged to perform a blanking process. Addition circuits 106 and 107 are arranged to add the above-stated HIT pulses only to the luminance signals Y1 and Y2. The HIT pulses are added to the left end of each line and are to be used as a phase reference signal at the time of reproduction. S/H circuits 108 to 111 are arranged to sample and hold video signals in accordance with clock signals Fs1 and Fs2. Subtraction circuits 112 and 113 are arranged in two channels to form color-difference signals R−Ya and B−Yb, respectively, from the two pairs of color signals and luminance signals coming from the image sensor 101. The luminance signals are supplied to the subtraction circuits 112 and 113 in the form of luminance signals Ya and Yb. The luminance signals Ya and Yb are obtained by switching the luminance signals Y1 and Y2 at a switch circuit 126 in accordance with a control signal which is formed on the basis of a result of comparison obtained by comparing a difference between the two luminance signals Y1 and Y2 with reference values.

Addition circuits 114 and 115 are arranged to add synchronizing pulses for color signals to the luminancne signals Y1 and Y2. Recording signal processing circuits 116 and 117 conforming to the SV system are arranged to receive color-difference line-sequential signals C via switches SW1 and SW2 and to receive also the luminance signals Y to which the above-stated synchronizing pulses are added. A switcher 118 is arranged to operate to realize the recording pattern shown in FIG. 4. Amplifiers 119 and 120 are arranged to amplify recording signals. An SV floppy disc 121 is used as a magnetic recording medium. A spindle motor 122 is arranged to drive and rotate the SV floppy disc 121. A 2-channel head 123 is arranged to record picture element information on the SV floppy disc 121.

The image sensor 101 simultaneously reads out either the signals on a pair of lines A and B or the signals on a pair of lines C and D shown in FIG. 6. Four signals including the color signals R and B and the luminance signals Y1 and Y2 are thus outputted from the image sensor 101. These signals are subjected to a blanking process at the blanking circuits 102 to 105. After this process, the signals are sampled at the S/H circuits 108 to 111. At that time, as mentioned above, the HIT pulses are added to the luminance signals Y1 and Y2 as a phase reference signal to be used at the time of reproduction. Further, the sampling process is performed at the timing of the clock signals Fs1 and Fs2. However, the phases of the clock signals Fs1 and Fs2 are arranged to deviate 180 degrees from each other. The phase difference corresponds to the fact that the positions of a pair of signals R and Y2 deviate from those of a pair of signals Y1 and B as much as one picture element in the horizontal direction. The signals sampled at the S/H circuits 108 to 111 become rectangular sample value signals for the analog transmission of sample values mentioned in the foregoing.

The subtraction circuits 112 and 113 form color-difference signals from the sampled color signals and luminance signals. However, luminance signals supplied to the subtraction circuits 112 and 113 are the luminance signals Ya and Yb which come from the switch circuit 126. The subtraction circuits 112 and 113 output color-difference signals R−Ya and B−Yb, respectively. These signals become color-difference line-sequential signals through the switches SW1 and SW2 before they are supplied to the recording signal processing circuits 116 and 117. At that time, the switches SW1 and SW2 are controlled in such a way as to prevent and the same color-difference signal from being simultaneously selected by these switches. Further, the luminance signals Y1 and Y2 coming from the image sensor 101 are supplied also to the recording signal processing circuits 116 and 117 after the above-stated synchronizing pulses are added to them at the addition circuits 114 and 115.

These signals supplied to the recording signal processing circuits 116 and 117 are subjected to various processes including an emphasis process, a frequency modulation process, etc. In addition to such processes, pilot signals which are to be used for TBC at the time of reproduction are also added to these signals by frequency multiplexing. As a result, the recording signal processing circuits 116 and 117 output signals RF1 and RF2, respectively. The signals RF1 and RF2 are sent to the 2-channel head 123 via the switcher 118 and the amplifiers 119 and 120. The head 123 then records these signals on the SV floppy disc 121 which is being rotated by the motor 122. In recording, picture element information of the lines A and B on the image sensor 101 (see FIG. 6) is first recorded in two tracks on the SV floppy disc 121. After that, the head 123 moves a distance corresponding to two tracks. Picture element information of the lines C and D shown in FIG. 6 is recorded in these next two tracks. As a result, a still image is recorded in a recording pattern as shown in FIG. 4.

In this case, as mentioned above, the luminance signals Ya and Yb are supplied from the switch circuit 126 to the subtraction circuits 112 and 113 which are arranged to supply the color-difference signals R−Ya and B−Yb to the recording signal processing circuits 116 and 117, respectively. The details of the switch circuit 126 are as shown in FIG. 14.

Figure 14:
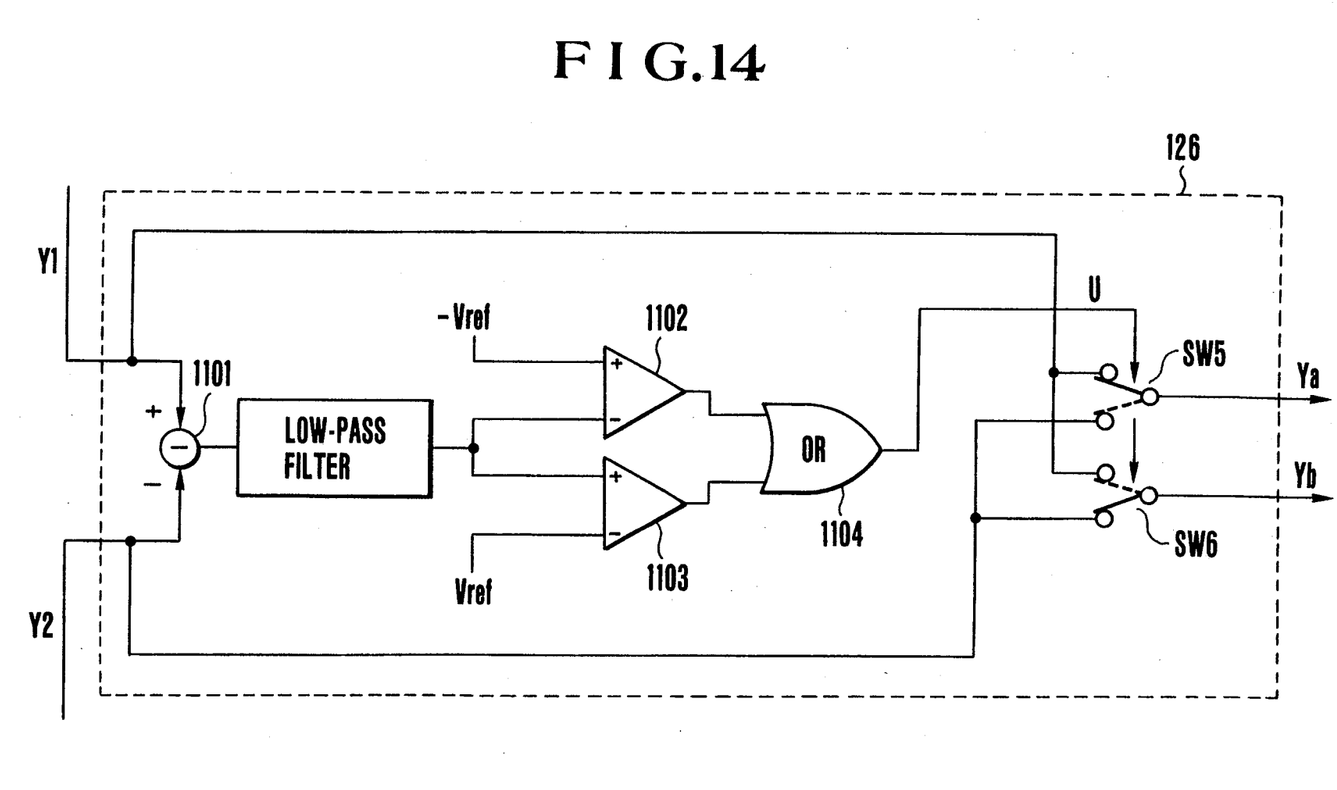
FIG. 14 is a circuit diagram showing the details of a switch circuit shown in FIG. 13.

Referring to FIG. 14, a switch SW5 is arranged to select, under the control of a control signal U, either the luminance signal Y1 or the luminance signal Y2 supplied to the switch circuit 126 and to supply the selected luminance signal to the subtraction circuit 112 as the luminance signal Ya. A switch SW6 is likewise arranged to select either the luminance signal Y1 or Y2 and to supply the selected luminance signal to the subtraction circuit 113 as the luminance signal Yb. These switches SW5 and SW6 never select the same luminance signal at the same time. The switch SW5 selects the luminance signal Y1 and the switch SW6 the luminance signal Y2 when the control signal U is at a high level. When the control signal U is at a low level, the switch SW5 selects the luminance signal Y2 and the switch SW6 the luminance signal Y1.

The above-stated control signal U is formed in the following manner: the luminance signals Y1 and Y2 from the image sensor 101 are supplied to a subtraction circuit 1101. The subtraction circuit 1101 calculates a difference (Y1−Y2) between the luminance signals Y1 and Y2 and output a difference signal Y1−Y2. The difference signal is supplied to comparators 1102 and 1103. The comparators 1102 and 1103 then compare the difference signal Y1−Y2 with given reference values −Vref and Vref, respectively. The outputs of the comparators 1102 and 1103 are supplied to an OR circuit 1104. The control signal U is thus obtained from the outputs of the two comparators under the OR condition of the OR circuit 1104. In this instance, the level of the control signal U becomes low only in a case where a relation of −Vref<(Y1−Y2)<Vref is obtained, and becomes high when this relation is not obtained. In other words, the control signal U is at a high level when the difference between the luminance signals Y1 and Y2 is above the reference value Vref and is at a low level when the difference is lower than the reference value Vref.

By the actions described, the luminance signals Ya and Yb are selected respectively as Ya=Y1 and Yb=Y2 in the case of a horizontal stripe of a black-and-white image as shown in FIG. 10 and as Ya=Y2 and Yb=Y1 in the case of a vertical stripe of a black-andwhite image as shown in FIG. 11. In either case of the image of FIG. 10 or the image of FIG. 11, therefore, the results of the arithmetic operations of the subtraction circuits 112 and 113 become (R−Ya)=0 and (B−Yb)=0. The color-difference signals thus become 0. Therefore, in the event of a black-and-white image, any aliasing distortion of the color-difference signals, irrespective as to whether it takes place in a vertical line part or a horizontal line part, is canceled by the subtracting operations performed in forming the color-difference signals.

In other words, with the four signals R, B, Y1 and Y2 outputted from the image sensor 101, when the subtraction circuit 112 is computing "R−Y1", the other subtraction circuit 113 computes "B−Y2". Conversely, when the subtraction circuit 112 is computing "R−Y2, the subtraction circuit 113 computes "B−Y1". These operations are controlled by means of the switch circuit 126. Therefore, as mentioned above, the aliasing components of a color-difference signals can be canceled out during the process of forming the color-difference signals. The aliasing distortions are thus effectively prevented from taking place in the vertical and horizontal line parts (including edge parts) of a black-and-white image, so that the picture quality can be greatly improved.

The arrangement of the circuit shown in FIG. 14 many be changed to compare the absolute value ($|Y1-Y2|$) of the difference between the luminance signals Y1 and Y2 with the reference value Vref in forming the control signal U. Further, while the reference values Vref and −Vref are fixed in the case of the embodiment described, these reference values may be arranged to be adaptively variable by some suitable means.

In accordance with this invention, as described in the foregoing, the two luminance signals outputted from the image sensing part are arranged to be switched from one over to the other in supplying them to the subtraction circuits which form the color-difference signals. This arrangement effectively cancels the aliasing components in the vertical and horizontal line parts of a black-and-white image including edge parts in the stage of forming the color-difference signals. Therefore, any aliasing distortions that take place in the vertical and horizontal line parts of the black-and-white image can be prevented, so that the picture quality can be greatly improved.

What is claimed is:

1. An image pickup apparatus, comprising:
   (a) image pickup means having a first line alternately including a first luminance filter and a first color filter, and a second line alternately including a second luminance filter and a second color filter;
   (b) read out means for reading out a first luminance signal corresponding to said first luminance filter, a first color signal corresponding to said second color filter, a second luminance signal corresponding to said second luminance filter and a second color signal corresponding to said second color filter;
   (c) mixing means for mixing said first luminance signal and said second luminance signal to form a first mixed luminance signal and a second mixed luminance signal;
   (d) first subtracting means for subtracting said first mixed luminance signal from said first color signal to form a first color different signal; and
   (e) second subtracting means for subtracting said second mixed luminance signal from said second color signal to form a second color difference signal.

2. An image pickup apparatus according to claim 1, wherein said first luminance filter and said second luminance filter are arranged in an offset manner.

3. An image pickup apparatus according to claim 1, wherein said mixing means includes third subtracting means for subtracting said first luminance signal from said second luminance signal.

4. An image pickup apparatus according to claim 1, wherein said mixing means includes first mixing means for forming said first mixed luminance signal and second mixing means for forming said second mixed luminance signal.

5. An image pickup apparatus according to claim 4, further comprising control means for controlling a mixing ratio of said first mixing means according to an output of third subtracting means.

6. An image pickup apparatus according to claim 5, wherein control means controls a mixing ratio of said second mixing means according to an output of third subtracting means.

7. An image pickup apparatus according to claim 1, further comprising recording means for recording said first luminance signal and said first color difference signal on a first region of a recording medium.

8. An image pickup apparatus according to claim 7, wherein said recording means records said second luminance signal and said second color difference signal on a second region of said recording medium.

9. An image pickup apparatus according to claim 8, wherein said recording means includes a first head corresponding to said first region and a second head corresponding to said second region.

10. An image pickup apparatus, comprising:
    (a) image pickup means producing a first luminance signal corresponding to a first luminance filter, a first color signal corresponding to a second color filter, a second luminance signal corresponding to a second luminance filter and a second color signal corresponding to a second color filter;
    (b) mixing means for mixing said first luminance signal and said second luminance signal to form a first mixed luminance signal and a second mixed luminance signal;
    (c) first subtracting means for subtracting said first mixed luminance signal from said first color signal to form a first color difference signal; and
    (d) second subtracting means for subtracting said second mixed luminance signal from said second color signal to form a second color difference signal.

11. An image pickup apparatus according to claim 10, wherein said first luminance filter and said second luminance filter are arranged in an offset manner.

12. An image pickup apparatus according to claim 10, wherein said mixing means includes third subtracting means for subtracting said first luminance signal from said second luminance signal.

13. An image pickup apparatus according to claim 10, wherein said mixing means includes first mixing means for forming said first mixed luminance signal and second mixing means for forming said second mixed luminance signal.

14. An image pickup apparatus according to claim 13, further comprising control means for controlling a mixing ratio of said first mixing means according to an output of third subtracting means.

15. An image pickup apparatus according to claim 14, wherein said control means controls a mixing ratio of said second mixing means according to an output of third subtracting means.

16. An image pickup apparatus according to claim 10, further comprising recording means for recording said first luminance signal and said first color difference signal on a first region of a recording medium.

17. An image pickup apparatus according to claim 16, wherein said recording means records said second luminance signal and said second color difference signal on a second region of said recording medium.

18. An image pickup apparatus according to claim 17, wherein said recording means includes a first head corresponding to said first region and a second head corresponding to said second region.

* * * * *

UNITED STATES PATENT AND TRADEMARK OFFICE
CERTIFICATE OF CORRECTION

PATENT NO. : 5,412,423
DATED : May 2, 1995
INVENTOR(S) : Kazuhito Ohashi

It is certified that error appears in the above-indentified patent and that said Letters Patent is hereby corrected as shown below:

Col. 4, line 4, after "in" insert --the--.
Col. 7, line 65, change "P=Y2" to --PxY2--.
Col. 9, line 60, delete "and".
Col. 11, line 29, change "many" to --may--.
Col. 11, line 57, change "second" to --first--.
Col. 11, line 68, change "different" to --difference--.
Col. 12, line 40, change "second" to --first--.

Signed and Sealed this

First Day of August, 1995

Attest:

BRUCE LEHMAN

*Attesting Officer*  *Commissioner of Patents and Trademarks*